US005472065A

United States Patent [19]

Vergin

[11] Patent Number: 5,472,065

[45] Date of Patent: Dec. 5, 1995

[54] LINEAR MOTION DRIVE

[75] Inventor: William E. Vergin, Sterling Heights, Mich.

[73] Assignee: Atoma International Inc., Ontario, Canada

[21] Appl. No.: 379,749

[22] Filed: Feb. 1, 1995

Related U.S. Application Data

[63] Continuation of Ser. No. 15,980, Feb. 10, 1993, abandoned.

[51] Int. Cl.[6] .............................. F03G 1/08; E05F 15/10

[52] U.S. Cl. ...................... 185/40 R; 74/89.15; 292/201; 292/DIG. 23; 292/DIG. 62

[58] Field of Search ........................ 74/89.15; 185/40 R; 292/201, DIG. 23, DIG. 62

[56] References Cited

U.S. PATENT DOCUMENTS

| | | | |
|---|---|---|---|
| 3,380,771 | 4/1966 | Rogers | 292/201 |
| 4,093,289 | 6/1978 | Inabayashi et al. | 292/DIG. 62 X |
| 4,135,377 | 1/1979 | Kleefeldt et al. | 70/264 |
| 4,170,374 | 10/1979 | Garcia | 292/201 |
| 4,257,634 | 3/1981 | Kleefeldt et al. | 292/336.3 |
| 4,269,440 | 5/1981 | Gelhard | 292/336.3 |
| 4,270,783 | 6/1981 | Sorensen et al. | 292/336.3 |
| 4,272,112 | 6/1981 | Schlick et al. | 292/201 |
| 4,290,634 | 9/1981 | Gelhard | 292/201 |
| 4,364,249 | 12/1982 | Kleefeldt | 70/264 |
| 4,624,491 | 11/1986 | Vincent | 292/201 |
| 4,669,283 | 6/1987 | Ingenhoven | 70/264 |
| 4,674,781 | 6/1987 | Reece et al. | 292/336.3 |
| 4,708,378 | 11/1987 | Ingenhoven | 292/201 |
| 4,723,454 | 2/1988 | Periou et al. | 74/89.15 |
| 4,736,829 | 4/1988 | Noel | 192/71 |
| 4,739,677 | 4/1988 | Kofink et al. | 292/201 |
| 4,779,912 | 10/1988 | Ikeda et al. | 292/201 X |
| 4,821,521 | 4/1989 | Schuler | 292/201 X |
| 4,875,723 | 10/1989 | Compeau et al. | 292/201 |
| 4,885,954 | 12/1989 | Wanlass | 74/625 |
| 4,893,704 | 1/1990 | Fry et al. | 292/201 X |
| 4,904,006 | 2/1990 | Hayakawa et al. | 292/336.2 |
| 4,932,277 | 6/1990 | Beaux | 292/201 X |
| 4,941,694 | 7/1990 | Bartel et al. | 292/201 |
| 4,948,183 | 8/1990 | Yamada | 292/199 |
| 4,969,672 | 11/1990 | Childs et al. | 292/201 |
| 4,978,155 | 12/1990 | Kobayashi | 292/336.3 |
| 5,037,145 | 8/1991 | Wilkes | 292/201 |
| 5,079,964 | 1/1992 | Hamada et al. | 74/89.15 |
| 5,137,312 | 8/1992 | Tang | 292/336.3 |
| 5,149,156 | 9/1992 | Kleefeldt | 292/336.3 |
| 5,273,324 | 12/1993 | Kobayashi | 292/201 |

FOREIGN PATENT DOCUMENTS

| | | | |
|---|---|---|---|
| 2596096 | 9/1987 | France . | |
| 311682 | 12/1990 | Japan | 292/DIG. 23 |

*Primary Examiner*—Allan D. Herrmann

*Attorney, Agent, or Firm*—Pennie & Edmonds

[57] ABSTRACT

A linear drive, particularly useful for locking or unlocking a door lock mechanism or the like permits manual operation by providing an output shaft that can move freely regardless whether the output shaft is in extended or retracted positions without back driving the motor. The output shaft is coaxially slideably situated over a screw which moves a nut that is theadingly engaged therewith and moves inside the output shaft along the axial direction of the screw. The output shaft is not threadingly engaged with the screw. The output shaft thus is freely movable relative to the screw, which results in essentially zero back drive of the screw and the motor. To provide for manual operation, the nut is automatically moved back to its neutral position every tie the output shaft is extended or retracted by a torsion spring or the like which can store energy therein. Whenever the motor is operated to drive the screw, the spring gear is also rotated, which causes the spring to store energy therein. As soon as the motor is turned off, the energy stored in the spring causes the worm gear to rotate in the direction opposite to the last motor driven direction to move the nut to the neutral position it was in prior to energization of the motor.

16 Claims, 5 Drawing Sheets

LINEAR MOTION DRIVE

This is a continuation of application Ser. No. 08/015,980, filed Feb. 10, 1993, now abandoned.

BACKGROUND

The present invention relates to a linear motion drive, in particular for generating a linear motion from a rotary motion while permitting independent manual linear operation.

There are many uses for linear motion drive devices. For instance, linear motion drive devices is particular suitable for locking or unlocking a door locking mechanism or the like. Power door locks, for example, have been in use for locking and unlocking doors in automobiles. There are many different types of actuators for actuating a locking mechanism for doors or the like.

A typical power lock mechanism comprises an electrical motor, and a rotary-to-linear transmission mechanism which translates rotary motion from the motor to a linear motion for actuating a door locking mechanism. The rotary-to-linear mechanism typically includes a reversibly rotatable lead-screw and a carriage which linearly rides in the longitudinal direction of the lead-screw as the lead-screw rotates or a rack and pinion type where the motor drives a pinion (gear) and causes the rack (carriage) to move linearly. The carriage or rack is mechanically connected to the locking mechanism.

If the lead-screw/carriage or rack and pinion is directly linked to the locking mechanism, manual operation may be hindered or rendered difficult since the motor has to be back driven. U.S. Pat. No. 4,723,454 issued to Periou et al, for instance, uses a carriage which slides along the lead-screw to permit manual operation. In particular, the lead-screw is permitted to freely rotate in both directions when the motor is not energized. The carriage is integral with a locking mechanism attaching end. By manually pushing or pulling the attaching end, the carriage can be moved linearly relative to the lead-screw. A drawback of this type is that manual operation causes back driving of the lead-screw and the motor, which increases the manual force necessary to operate the locking mechanism. Moreover, because the carriage actually rides on the helical groove of the lead-screw, the carriage does not readily move in the linear direction.

Many different devices have been contemplated in the past to prevent back driving of the motor and the lead-screws or the like during manual operation. U.S. patents U.S. Pat. No. 4,290,634 issued to Gelhard; U.S. Pat. No. 4,821,521 to Schuler; U.S. Pat. No. 4,893,704 to Fry et al; U.S. Pat. No. 4,978,155 to Kobayashi, for instance, show various types of devices for preventing back driving of the motor during manual operation.

U.S. Pat. No. 4,978,155 uses a clutch mechanism between a drive shaft and an output shaft to transmit power from the drive shaft to the output shaft. Specifically, the drive shaft is directly connected to the output of the motor and the output shaft is connected to a lock mechanism operating rod. The operating rod moves linearly about the longitudinal axis of the output shaft via a helical thread formed on the output shaft. The clutch mechanism couples the drive shaft to the output shaft only when the motor is energized. At all other times, the output shaft freely rotates relative to the drive shaft. Similar to U.S. Pat. No. 4,723,454, the operating rod may be manually depressed or extended, but such action causes the output shaft to rotate during manual operation, which increases the force necessary to move the operating rod. However, due to the clutch mechanism, the motor is not back driven in this type of arrangement.

U.S. Pat. No. 4,893,704, on the other hand, uses complicated, coaxially arranged inner main and outer secondary shafts having opposed external threads that cooperate to send a drive member to a neutral position without changing the direction of the motor during manual operation. Specifically, the drive member is connected to the outer secondary shaft via a lost motion device to permit manual operation without back driving the motor. However, a drawback with this type of device is that the shaft needs to be further driven after the locking mechanism has been already actuated to position the drive member in a neutral position.

U.S. Pat. No. 4,290,634 shows a use of a flywheel that is connected to a motor to store energy which is used to actuate the door lock mechanism. When the lock operation is completed, the flywheel is uncoupled from the lock so that its residual energy is not absorbed by the lock to permit manual operation without turning the flywheel during manual operation. Specifically, one end of the rack has an abutment head which may be shifted into engagement with a C-shaped connector, which is connected to the lock mechanism and a manual operating knob, by suitably turning the pinion to drive the rack. A spiral spring is operatively connected to a shaft of the pinion to rotate the pinion using the energy stored in the spring to bring the abutment head in a neutral position to permit the manual knob to be depressed or extended without interference from the abutment head. In other words, a lost-motion type of connector is provided between the abutment head and the lock mechanism via the C-connector.

U.S. Pat. No. 4,821,521, similar to U.S. Pat. No. 4,290,634, uses the energy stored in a coil or helical spring to bring the positioning element, which is connected to a locking mechanism, to an initial position when the motor is shut off. In this device, the positioning element is threadingly engaged with the gear spindle. The positioning element appears to be brought back to whatever position it was in prior to the actuation of the motor. It appears that there can be no manual operation with this type of actuator, or, at the very least, manual operation will be rather difficult since the positioning element is threadingly engaged to the gear spindle. Any type of manual operation disadvantageously requires the spindle and thus the motor to be back driven.

SUMMARY OF THE INVENTION

Accordingly, the primary object of the present invention is to provide an improved mechanism for returning a rotary-to-linear mechanism to a neutral position without using a power drive.

Another object of the invention is to provide manual operation without back driving the motor or the transmission means.

Another object of the invention is to provide a power actuator for a door locking mechanism, which is free of the above-mentioned drawbacks.

Another object of the invention is to provide a simple and efficient manual and power operations.

These and other objects of the invention are achieved in the present invention by providing an output shaft that can move freely regardless of whether the output shaft is in extended or retracted positions, without back driving the motor or any of the driving elements. Specifically, the present invention provides an electrical motor with a gear, preferably helical for noise reduction purposes, which mates with preferably a worm gear. The worm gear is fixedly held collinearly with an elongated screw. The worm gear shaft is mated with a worm nut which travels along the axis of the screw as the worm gear rotates. The output shaft is coaxially situated over the worm gear with no thread engagement therebetween. The output shaft thus is freely movable relative to the screw in the longitudinal or axial direction thereof, which results in essentially zero back drive of the screw when manually moving the output shaft.

The output shaft and the nut are fixedly held from rotation so that rotation of the screw causes the nut to move linearly along the axis thereof, driving the output shaft linearly as the nut abuts against either of a pair of spaced apart abutments positioned within the output shaft. The two abutments are spaced along the axial direction of the output shaft. When the motor rotates to cause the screw shaft to rotate in one direction so as to move the nut in the upward direction, the nut abuts against the upper abutment, causing the output shaft to move upward. When the motor rotates in the other direction so as to cause the nut to move in the downward direction, the nut abuts against the lower abutment, causing the output shaft to move downward.

To provide for manual operation, the nut is brought to a neutral position without driving the motor every time the output shaft is extended or retracted. This is achieved by providing a gear train engaging with the worm gear to drive a torsion spring or the like which can store energy therein. Specifically, in the present invention, the worm gear is collinearly arranged relative to another gear which is operatively engaged with the spring gear. The spring gear winds the torsion spring or the like whenever the motor is energized to rotate the worm gear. Whenever the motor is operated to drive the worm gear, the spring gear is also rotated, which causes the spring to store energy therein. As soon as the motor is turned off, the energy stored in the spring causes the worm gear to rotate in the direction opposite to the last motor driven direction, which in turn brings the nut to the neutral position or the last position it was in prior to the energization of the motor. In the neutral position, the nut is preferably positioned adjacent to the upper abutment, when the output shaft is in its lowermost or retracted position or adjacent to the lower abutment when the output shaft is in its uppermost or extended position.

By positioning the nut in the neutral position which is adjacent to one of the abutments, manual operation can be readily realized, without back driving the screw nor the motor. The nut is preferably positioned adjacent to the output shaft's upper and lower abutments, in its neutral position, so that the nut can travel a small distance to build a momentum prior to contacting one of the abutments. This provides for higher initial force for breaking through ice which may build up, for instance, if used in an automotive door lock system in the winter time, and for breaking through debris which may build up over a period of use.

These and other objects of the invention will become more readily apparent in the ensuing specification when taken together with the drawings.

DESCRIPTION OF THE PREFERRED EMBODIMENTS

Figure 1:
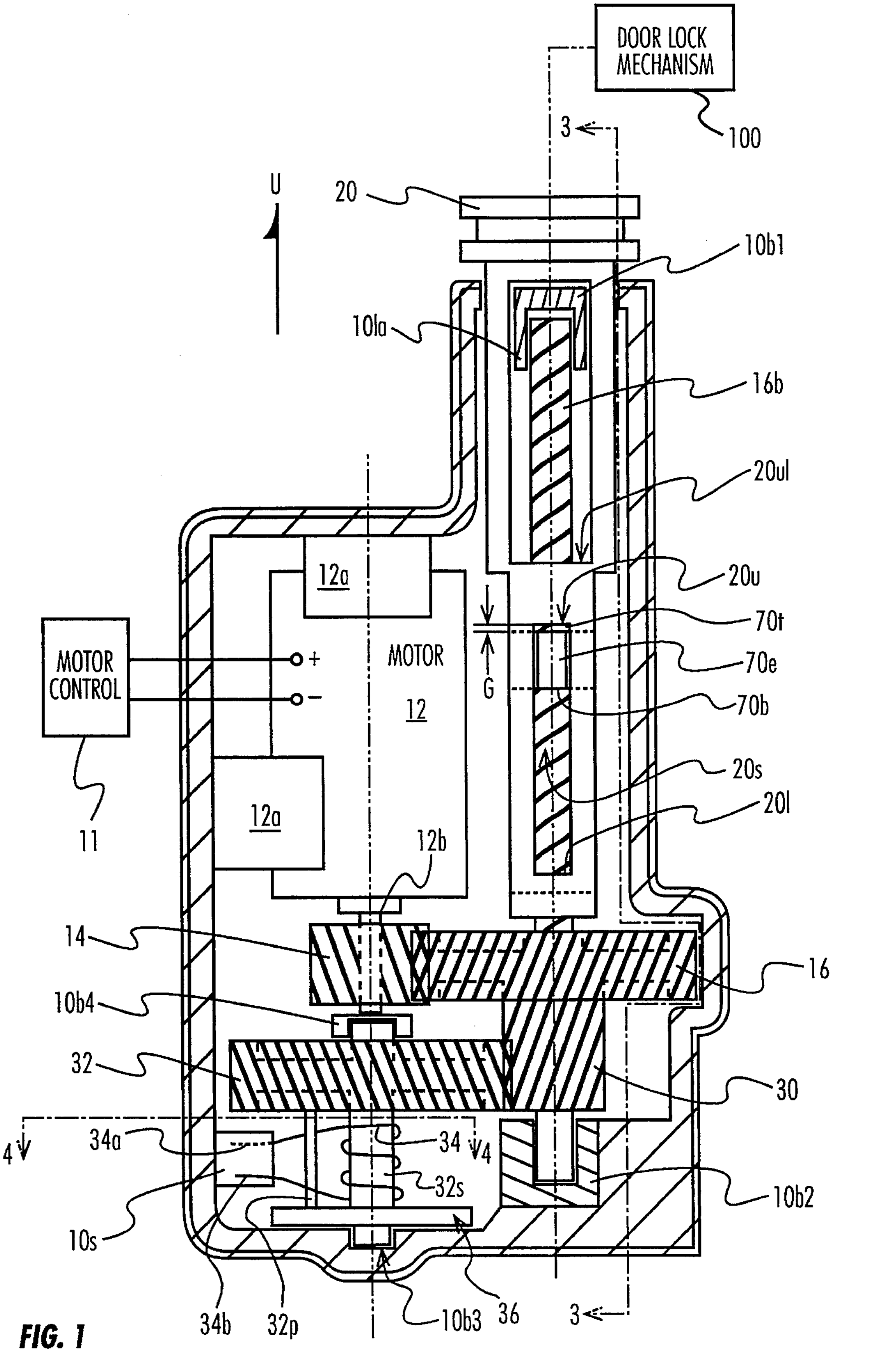
FIG. 1 is a partially broken front elevational view of a preferred embodiment of the present invention with the output shaft in the retracted position and the nut in the neutral position.

The embodiments described herein have been contemplated for purposes of illustrating the principles of the present invention. Accordingly, the present invention is not to be limited solely to the exact configuration and construction illustrated and set forth herein.

The use of directional description such as upward, upper, downward, and down, has been contemplated only for purposes of describing the drawing figures. Therefore, as the directional description is merely relative, depending upon how the actual present linear drive is positioned or mounted, the present invention is not to be confined to the directional description set forth herein.

Figure 2:
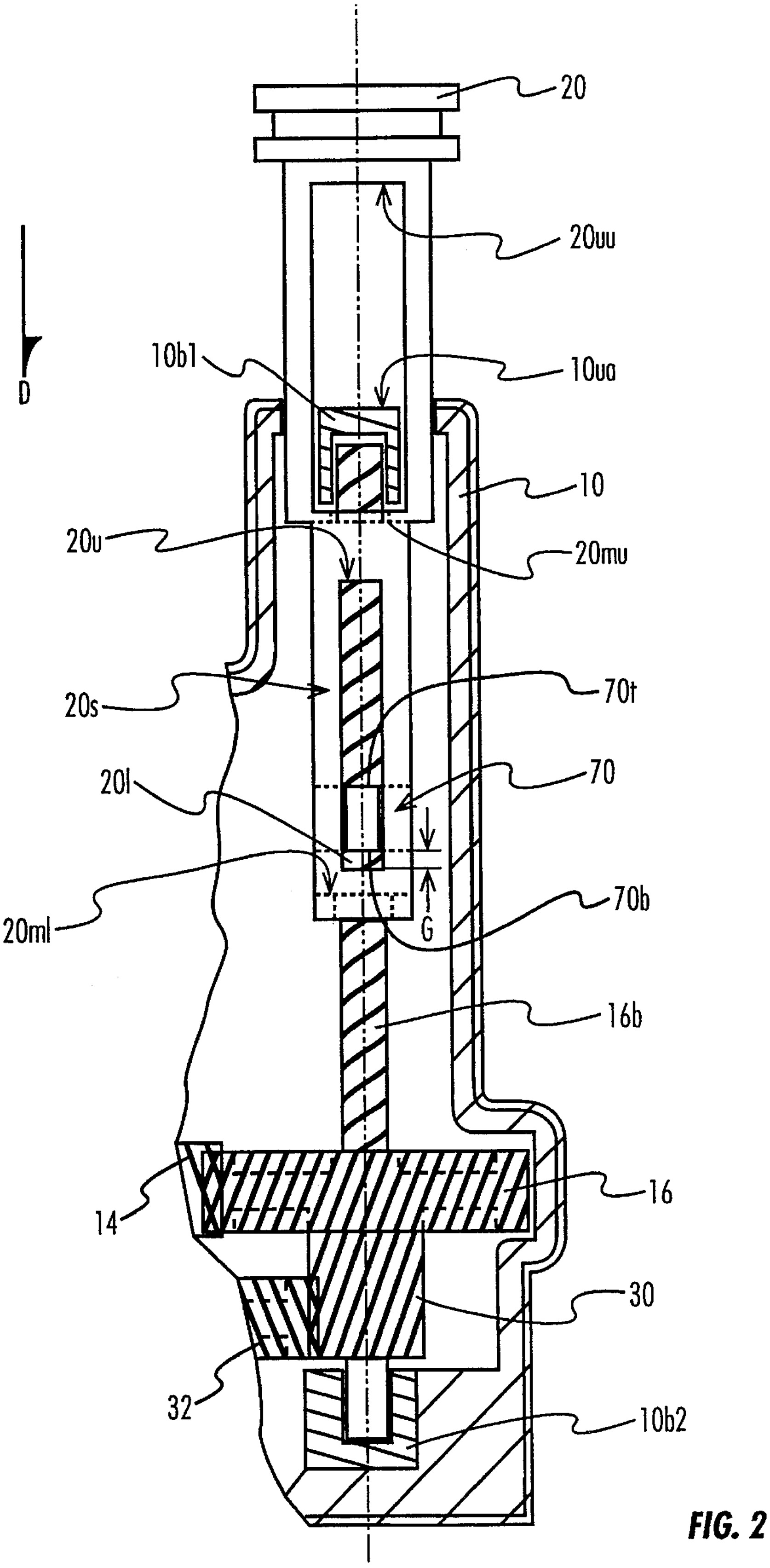
FIG. 2 is similar to FIG. 1, but partially shown, with the output shaft in the extended position and the nut in the neutral position.

FIGS. 1 and 2 show the present invention with the output shaft 20 in the retracted and extended positions, respectively. FIG. 1 schematically shows the overall arrangement of the elements that make up the linear drive 1, with a portion of the housing 10 being shown removed or broken away and the output shaft 20 in the retracted position, which is operatively connected to a door lock mechanism or the like 100 schematically shown. Although not shown, it is to be noted that the housing 10 substantially encloses the entire linear drive. FIG. 2 is identical to FIG. 1, but only partially shows the linear drive, with the output shaft 20 in the extended position.

The linear drive 1 comprises an electrical motor 12 which is controlled by, for instance, a conventional motor control 11 driven by a D.C. power source, for instance, from the battery of an automobile. The motor 12 is stably held or attached to the housing 10 via conventional brackets or the like **12*a*. The motor control 11 controls the rotational direction of the motor and the time duration of the input voltage to the motor. Additionally, sensors and switches (not shown), which can be actuated by various moving elements of the linear drive such as the nut 70 and the output shaft 20, may be located inside the housing to control the motor. The motor 12 has at its shaft 12b, a gear 14 which is engaged with a drive gear 16. The drive gear in turn is fixedly and collinearly attached to or integrally formed with a screw 16*b*. The screw 16*b* in turn is threadingly engaged with the nut 70 which is prevented from rotation, so that the rotating of the screw 16*b* causes the nut to displace linearly along the axis of the screw 16*b*. It is to be noted that any type of gear can be contemplated in the present invention such as spur gears. However, it is preferable to use gears 14, 16, 30, 32 which are helical for purposes of noise reduction. Screw 16*b* is journaled for rotation via bearing blocks or the like 10*b*1 and 10*b*2 formed with or attached to the housing 10**.

Figure 3:
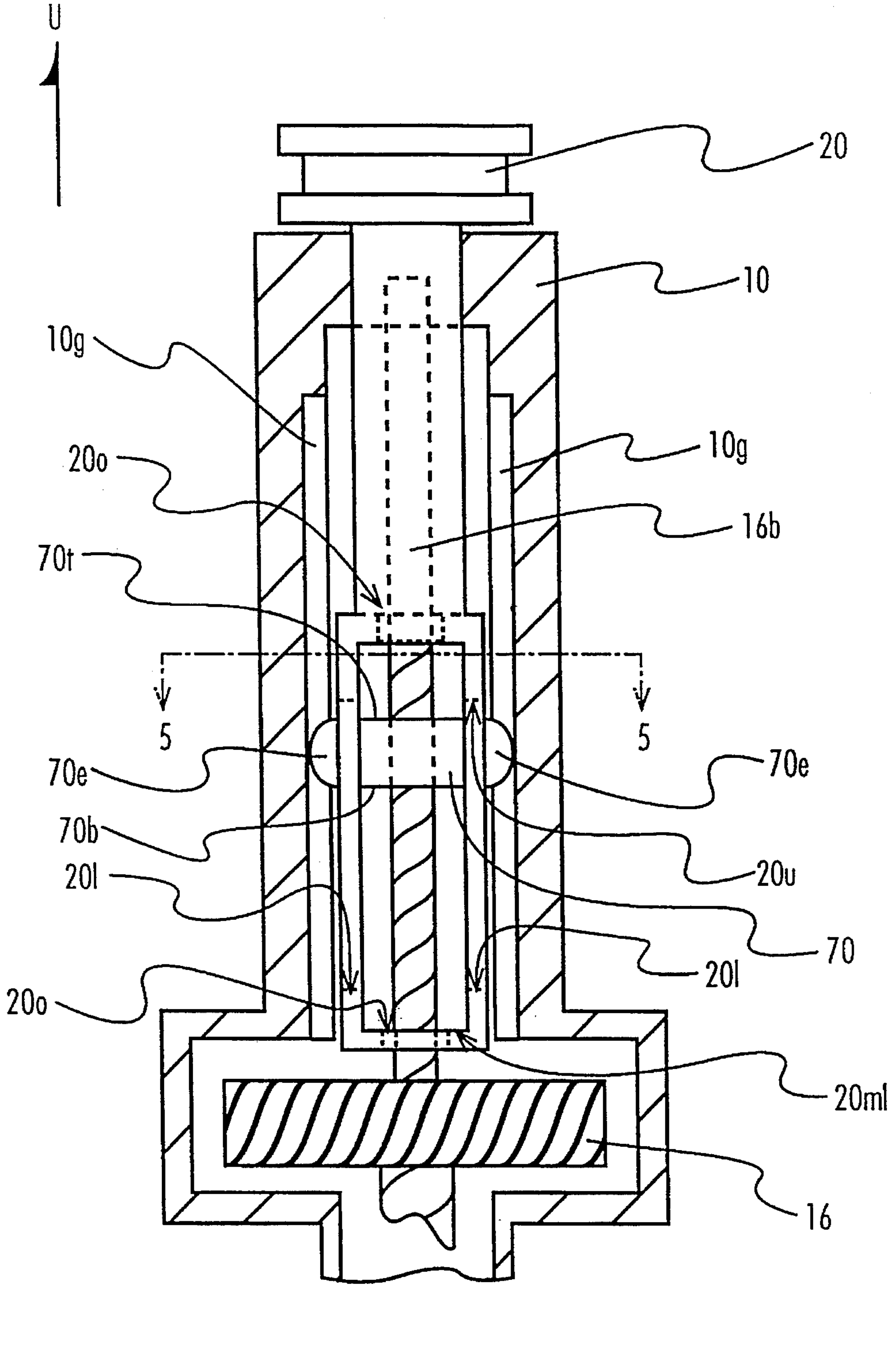
FIG. 3 is a partially broken side elevational view taken along line 3—3 of FIG. 1
Figure 5:
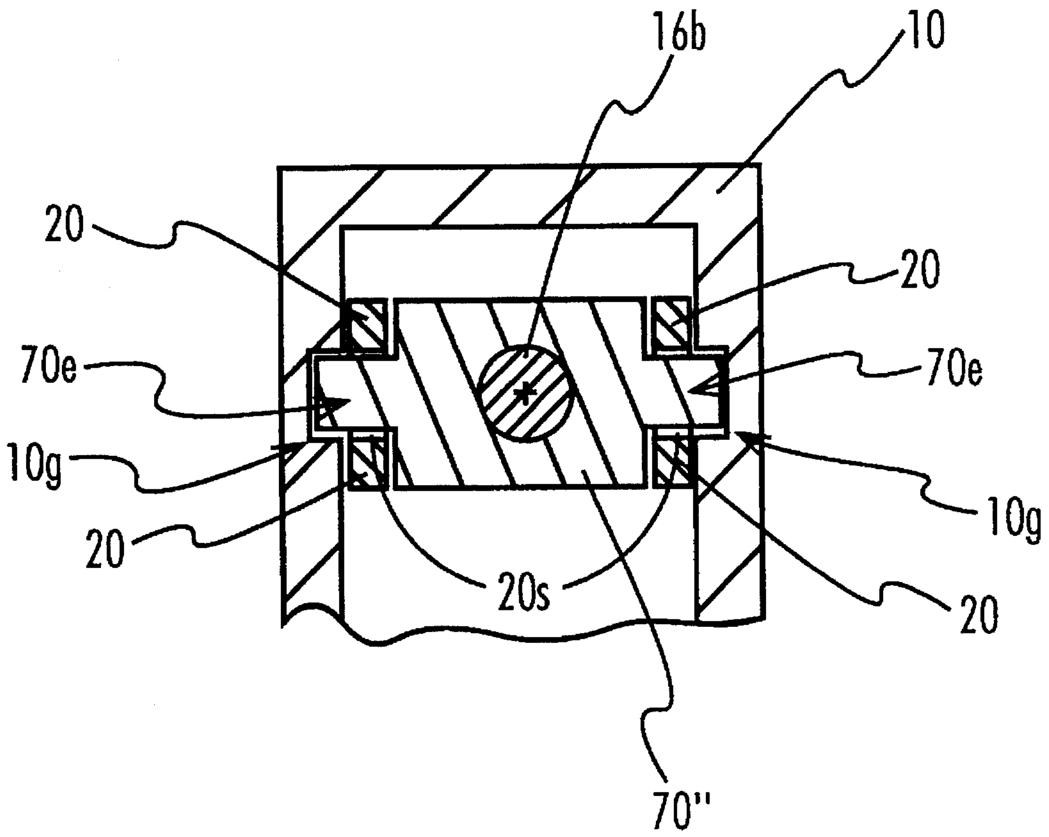
FIG. 5 is a cross-sectional view taken along line 5—5 of FIG. 3 to show the arrangement between the nut and the output shaft more clearly.

FIGS. 2, 3 and 5 more clearly show the means for rotatably fixing the nut 70 relative to the output shaft 20 and the housing. Specifically, the nut 70 has a pair of diametrically opposed extensions **70*e* formed on the sides thereof, which extend through a pair of diametrically opposed slots 20*s* formed along the length of the output shaft 20 between a mid-upper abutment 20*mu*** and a lower most abutment 20*ml*, and engage a pair of diametrically opposed grooves 10*g* formed on the housing 10. The groove/extension architecture permits the nut to substantially freely slide relative to the output shaft 20 and the housing 10 along the axial direction of the output shaft 20, but is prevented from rotating relative to the output shaft 20 and the housing 10. Moreover, the extension 70*e* of the nut 70 further prevents the output shaft 20 from rotating relative to the housing 10.

By rotating the screw 16*b*, the nut 70 travels along the axis of the screw 16*b*. The output shaft 20 is coaxially situated with the screw 16*b* with no thread engagement therebetween to permit the output shaft 20 to freely move relative to the screw 16*b* in the axial direction thereof. Openings 20*o* with a sufficient clearance to permit the screw to rotate and the output shaft to move relative to the screw 20, without interference are formed in the mid-upper abutment 20*mu* and the lower most abutment 20*ml* to permit the output shaft to freely move relative to the screw 16*b*.

The drive gear 16 also is collinearly formed with or attached to an output gear 30. The end of the output gear is rotatably journaled in a bearing block 10*b*2. The output gear 30 mates with a spring gear 32 which in turn is rotatably journaled for rotation in bearing blocks 10*b*3, 10*b*4. The spring gear 32 is fixedly attached to a spring gear shaft 32*s*. A preloaded torsion or helical spring 34 is coaxially situated with the spring gear shaft 32*s*. A spring drive pin 32*p* extends parallel to the spring gear shaft 32*s* and attached to the spring gear and the cover 36. The spring gear 32, the spring pin 32*p* and the cover 36 are fixed relative to each other so that they rotate in unison.

Figure 4:
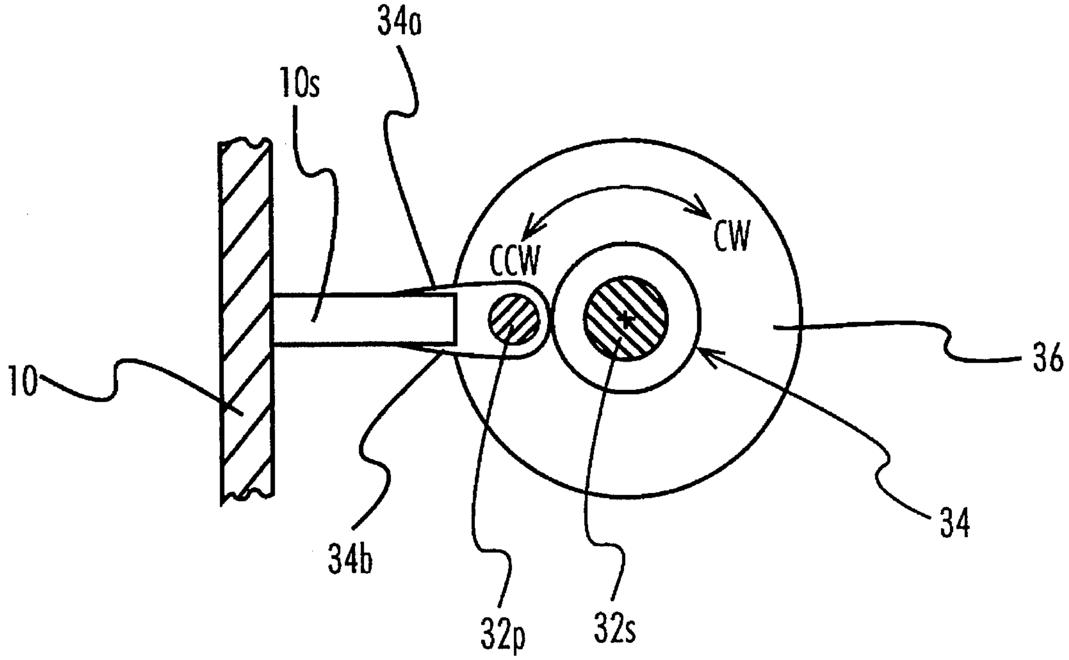
FIG. 4 is a cross-sectional view taken along line 4—4 of FIG. 1.

The arrangement of the spring 34 relative to the spring gear shaft 32*s* and the spring drive pin 32*p* is better shown in FIGS. 1 and 4. The ends 34*a*, 34*b* of the spring 34 extend generally laterally to the spring gear shaft 32*s*, with the spring gear pin 32*p* situated between the spring ends and a stop 10*s* formed inside the wall of the housing 10. The spring 34 is arranged such that rotation of the spring gear 32 and thus the spring gear pin 32*p* in either direction by the motor causes the spring to wind. More specifically, as shown in FIG. 4, if the motor is driven to rotate the spring gear 32 in the clock-wise direction CW, the pin 32*p* engages the upper end 34*a* of the spring and rotates the same in the clock-wise direction CW, driving the same away from the stop 10*s*, while the lower end 34*b* of the spring 34 is urged toward and abuts the stop 10*s*. This causes the spring 34 to wind and store energy therein. As soon as the motor is turned off, the spring 34 unwinds in the counter clock-wise direction CCW, in the direction opposite to the last motor driven direction. That is, the upper end 34*a* of the spring engages the pin 32*p* and rotates the spring gear 32 in the counter clock-wise direction, thus driving the screw 16*b*, which in turn drives the nut 70 substantially back to the neutral position or the last position the nut was in prior to energization of the motor.

Similarly, if the motor is driven to rotate the spring gear in the counter clock-wise direction CCW, the pin 32*p* engages the lower end 34*b* of the spring and rotates the same in the counter clock-wise direction CCW, driving the same away from the stop 10*s*, while the upper end 34*a* of the spring 34 is urged toward and abuts the stop 10*s*. This causes the spring 34 to wind and store energy therein. As soon as the motor is turned off, the spring unwinds in the clock-wise direction CW, in the direction opposite to the last motor driven direction. That is, the lower end 34*b* of the spring engages the pin 32*p* and rotates the spring gear 32 in the clock-wise direction, thus driving the screw 16*b*, which in turn drives the nut 70 substantially back to the neutral position or the last position the nut was in prior to energization of the motor.

The preloading of the spring 34 provides for a predetermined return force sufficient to overcome any frictional losses between the gears.

The output shaft 20 and the nut 70 are fixedly held from rotating via the groove/extension architecture, for example, so that rotation of the screw 16*b* causes the nut to move linearly along the axis of the screw, driving the output shaft 20 linearly when the nut 70 abuts against either of the spaced apart abutments 20*u* and 20*l* formed by the ends of the slots 20*s*.

As shown in FIG. 1, the output shaft 20 is in the retracted position, at which the output shaft 20 is positioned such that the top portion 70*t* of the nut is adjacent to the upper abutment 20*u*. In operation, when the motor 12 is energized to rotate the screw 16*b* to move the nut 70 in the upward direction U, the top portion 70*t* of the nut 70 abuts against the upper abutment 20*u* and drives the output shaft upward to the extended position as shown in FIG. 2, until the upper-lower abutment 20*ul* of the output shaft 20 abuts against or is immediately adjacent to the lower abutment 10*la* formed by the bearing block 10*b*1.

When the motor stops, the stored energy from the spring 34 rotates the screw 16*b* in the direction opposite to the last motor driven direction, moving the nut 70 in the downward direction D, and bringing the nut 70 to its neutral position as shown in FIG. 2, all without moving the output shaft 20 since the nut 70 is slidingly moveable relative to the output shaft 20. The lower portion 70*b* of the nut 70 is preferably adjacent the lower abutment 20*l* at its neutral position. At this point, the output shaft 20 can be manually moved in the downward direction D to the retracted position and moved back to the extended position with essentially zero backdriving of the screw 16*b* and the motor.

When the output shaft is in the extended position as shown in FIG. 2, as previously discussed, the lower portion 70*b* of the nut 70 abuts or is preferably adjacent the lower abutment 201 of the output shaft 20. A slight gap G between the nut and the upper and lower abutments 20*u* and 20*l* is present, which is generally caused by hysterisis in the gears and variations in component dimensions. However, this gap is preferable since it permits the motor/worm/nut to build momentum prior to contacting the output shaft, which provides for higher initial force for breaking through any ice and debris. The output shaft 20 is moved until the upper-upper abutment 20*uu* of the output shaft abuts against or is immediately adjacent to the upper abutment 10*ua* of the bearing block 10*b*1. Again, when the motor stops, the stored energy from the spring 34 rotates the screw 16*b* in the direction opposite to the last motor driven direction, moving the nut 70 in the upward direction U, and bringing the nut to its neutral position as shown in FIG. 1, all without moving the output shaft 20 since the nut 70 is slidingly moveable relative to the output shaft 20. At this point, the output shaft 20 can be manually moved in the upward direction U to the extended position and moved back to the retracted position with essentially zero backdriving of the motor and the screw 16*b*.

Sensors or switches (not shown) may be used to stop the motor at the appropriate sensed positions. For instance, sensors may be placed along the length of the output shaft to detect the position of the output shaft and cause the motor to stop when the output shaft is at the extended position or retracted position. The particular arrangement of sensors and switches to control the motor is believed to be well known to one versed in the art, and thus need not be disclosed herein. U.S. Pat. No. 4,135,377 issued to Kleefeldt, et al. and U.S. Pat. No. 4,893,704, for instance, disclose sensors and switches for controlling a motor.

Given the disclosure of the present invention, one versed in the art would readily appreciate the fact that there can be many modifications of the present invention not specifically depicted and described, but that are well within the scope and spirit of the disclosure set forth herein. Accordingly, all expedient modifications readily attainable by one versed in the art from the disclosure set forth herein that are within the scope and essence of the present invention, are to be included as further embodiments of the present invention.

What is claimed is:

1. A linear drive which permits manual locking and unlocking operation, comprising:

a housing;

an electric motor mounted in said housing;

a screw rotatably mounted in said housing and operatively engaged with said electric motor for rotation thereof;

a hollow output shaft coaxially and telescopingly situated over said screw and freely movable relative to said screw in an axial direction of said screw between an extended position and to a retracted position, said output shaft having an upper abutment and a lower abutment that are spaced apart in said axial direction;

a positioning element threadingly engaged with said screw and located between said abutments, wherein said positioning element is movable between said abutments without moving said output shaft, wherein said positioning element engages said upper abutment to move said output shaft upward to said extended position upon energization of said motor in one direction and engages said lower abutment to move said output shaft downward to said retracted position upon energization of said motor in a direction opposite to said one direction; and an automatic positioning element repositioner for automatically moving said said positioning element to a neutral position, without energizing said motor, after said motor has been energized to cause said positioning element to move said output shaft to said extended and retracted positions, said neutral position being the position at which said positioning element is adjacent said lower abutment when said output shaft is in said extended position and being the position at which said positioning element is adjacent said upper abutment when said output shaft is in said retracted position, wherein said repositioner comprises a spring gear rotationally mated with said screw and a helical or torsion spring coaxially positioned relative to said spring gear, said spring being energized by rotational movement of said spring gear imparted by said screw, wherein said spring rotates said spring gear in the opposite direction to the last driven direction, which rotates said screw to move said positioning element to said neutral position, wherein by virtue of said neutral position of said positioning element being situated adjacent said upper abutment of said output shaft when said output shaft is in said retracted position, said output shaft is manually and repeatedly movable to said extended position and back to said retracted position without back driving said screw and said motor and by virtue of said neutral position of said positioning element being situated adjacent said lower abutment when said output shaft is in said extended position, said output shaft is manually and repeatedly movable to said retracted position and back to said extended position without back driving said screw and said motor.

2. A linear drive according to claim 1, further comprising a drive gear collinearly attached to said screw, and an output gear attached to an output of said motor and which mates with said drive gear.

3. A linear drive according to claim 2, further comprising a spring drive gear collinearly attached to said drive gear and mating with said spring gear.

4. A linear drive according to claim 3, wherein said spring gear, drive gear, output gear and spring drive gear are helical gears.

5. A linear drive according to claim 1, further comprising a spring gear shaft coaxially connected to said spring gear, wherein said spring is coaxially positioned with said spring gear shaft.

6. A linear drive according to claim 5, further including a pin extending from said spring gear, said pin extending substantially parallel to said spring gear shaft and radially spaced therefrom and wherein said housing includes a stop wall, wherein one end of said spring abuts against said pin and the other end of said spring abuts against said stop wall when said spring gear is rotated to store energy therein.

7. A linear drive according to claim 1, wherein said upper and lower abutments each have an opening with sufficient clearance to permit said screw to freely pass therethrough and rotate without interference therefrom, wherein the distance between said upper and lower abutments being equal to or less than the distance of travel of said output shaft between said extended position and said retracted position.

8. A linear drive according to claim 7, wherein said output shaft includes a pair of opposed slots formed inside a predetermined length of said output shaft between said upper and lower abutments and a corresponding pair of opposing extensions formed on said positioning element to slidingly ride on said slots; and a pair of opposed parallel grooves formed on inside walls of said housing and running parallel to said slots and engaging said extensions so as to prevent said positioning element and said output shaft from rotating.

9. A linear drive for actuating a door locking mechanism which permits manual locking and unlocking operation, wherein an electric motor drives an output shaft, which is operatively linked to cause locking and unlocking of said locking mechanism, between an extended position and a retracted position, relative to a housing which substantially encloses elements of said linear drive, said linear drive comprising:

a screw rotatably mounted in said housing and operatively engaged with said electric motor for rotation thereof;

a hollow output shaft coaxially and collinearly situated over said screw and freely movable relative to said screw to extended and retracted positions in an axial direction of said screw, said output shaft having an upper abutment and a lower abutment that are spaced apart in said axial direction;

a positioning element threadingly engaged with said screw and located between said abutments, wherein said positioning element is movable between said abutments without moving said output shaft, wherein said positioning element engages said upper abutment to move said output shaft upward to said extended position upon energization of said motor in one direction and engages said lower abutment to move said output shaft downward to said retracted position upon energization of said motor in a direction opposite to said one direction; and an automatic positioning element repositioner for automatically moving said said positioning element to a neutral position, without energizing said motor, after said motor has been energized to cause said positioning element to move said output shaft to said extended and retracted positions, said neutral position being the position at which said positioning element is adjacent said lower abutment when said output shaft is in said extended position and being the position at which said positioning element is adjacent said upper abutment when said output shaft is in said retracted position, wherein said repositioner comprises a spring gear rotationally mated with said screw and a helical or torsion spring coaxially positioned relative to said spring gear, said spring being energized by rotational movement of said spring gear imparted by said screw, wherein said spring rotates said spring gear in the opposite direction to the last driven direction, which rotates said screw to move said positioning element to said neutral position, wherein said output shaft is mechanically linked to said door locking mechanism to permit locking and unlocking of the same, wherein by virtue of said neutral position of said positioning element being situated adjacent said upper abutment of said output shaft when said output shaft is in said retracted position, said output shaft is manually and repeatedly movable to said extended position and back to said retracted position without back driving said screw and said motor and by virtue of said said neutral position of positioning element being situated adjacent said lower abutment when said output shaft is in said extended position, said output shaft is manually and repeatedly movable to said retracted position and back to said extended position without back driving said screw and said motor.

10. A linear drive for a door locking mechanism according to claim 9, further comprising a drive gear collinearly attached to said screw, and an output gear attached to an output of said motor and which mates with said drive gear.

11. A linear drive for a door locking mechanism according to claim 10, further comprising a spring drive gear collinearly attached to said drive gear and mating with said spring gear.

12. A linear drive for a door locking mechanism according to claim 11, wherein said spring gear, drive gear, output gear and spring drive gear are helical gears.

13. A linear drive for a door locking mechanism according to claim 9, further comprising a spring gear shaft coaxially connected to said spring gear, wherein said spring is coaxially positioned with said spring gear shaft.

14. A linear drive for a door locking mechanism according to claim 13, further including a pin extending from said spring gear, said pin extending substantially parallel to said spring gear shaft and radially spaced therefrom and wherein said housing includes stop wall, wherein one end of said spring abuts against said pin and the other end of said spring abuts against said stop wall when said Spring gear is rotated to store energy therein.

15. A linear drive for a door locking mechanism according to claim 9, wherein said upper and lower abutments each have an opening with sufficient clearance to permit said screw to freely pass therethrough and rotate without interference therefrom, wherein the distance between said upper and lower abutments being substantially equal to or less than the distance of travel of said output shaft between said extended position and said retracted position.

16. A linear drive for a door locking mechanism according to claim 15, wherein said output shaft includes a pair of opposed slots formed inside a predetermined length of said output shaft between said upper and lower abutments and a corresponding pair of opposing extensions formed on said positioning element to slidingly ride on said slots; a pair of opposed parallel grooves formed on inside walls of said housing and running parallel to said slots and engaging said extensions so as to prevent said positioning element and said output shaft from rotating.

* * * * *